US006923408B2

(12) United States Patent
Peng

(10) Patent No.: US 6,923,408 B2
(45) Date of Patent: Aug. 2, 2005

(54) CABLE RETAINER USED IN BOAT

(76) Inventor: Yi Hsing Peng, 235 Chung-Ho Box 8-24, Taipei (TW)

( * ) Notice: Subject to any disclaimer, the term of this patent is extended or adjusted under 35 U.S.C. 154(b) by 94 days.

(21) Appl. No.: 10/662,435

(22) Filed: Sep. 16, 2003

(65) Prior Publication Data
US 2005/0056737 A1   Mar. 17, 2005

(51) Int. Cl.[7] .................................................. F16L 3/00
(52) U.S. Cl. ......................................... 248/73; 248/71
(58) Field of Search ......................... 248/71, 74.4, 74.5, 248/74.1, 73, 65, 49

(56) References Cited

U.S. PATENT DOCUMENTS 4,842,237 A * 6/1989 Wollar ......................... 248/548

2002/0179780 A1 * 12/2002 Benoit et al. ................. 248/73

* cited by examiner

Primary Examiner—Ramon O Ramirez

(57) ABSTRACT

A cable retainer comprises a retaining block and a retaining seat. The retaining block comprises a first top disk; and an annular sleeve extending from the first top disk. The annular sleeve enclosing the inserting rod has a long guide slot. An uppermost of the guide slot is extended with engaging slots from two sides thereof and a lowermost end of an inner surface of the annular sleeve has an annular limiting trench. The retaining seat further comprises a second top disk and an inserting rod extending from the top disk. A lower end of the inserting rod has a stopper for resisting the first top disk against the second top disk. The retaining block and the retaining seat are fixed to the boat body by using a stud. A small block extends from the retaining seat at a position corresponding to the annular limiting trench of the retaining block.

2 Claims, 4 Drawing Sheets

PRIOR

FIG. 2-A

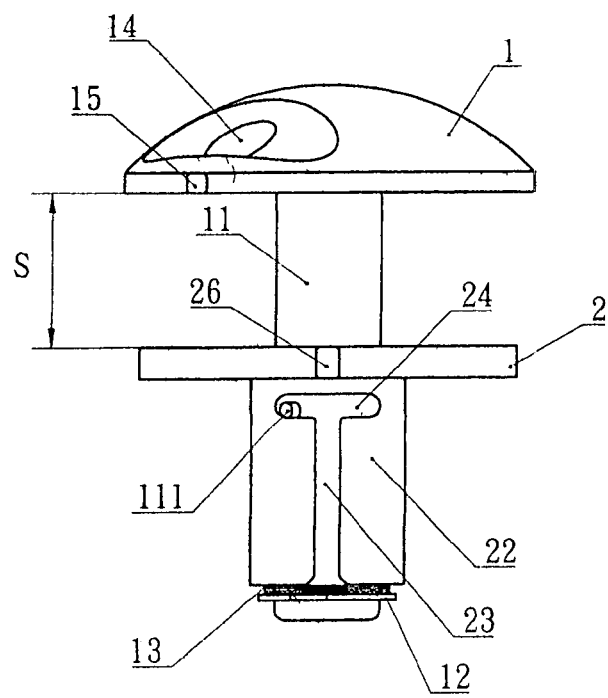
FIG. 4
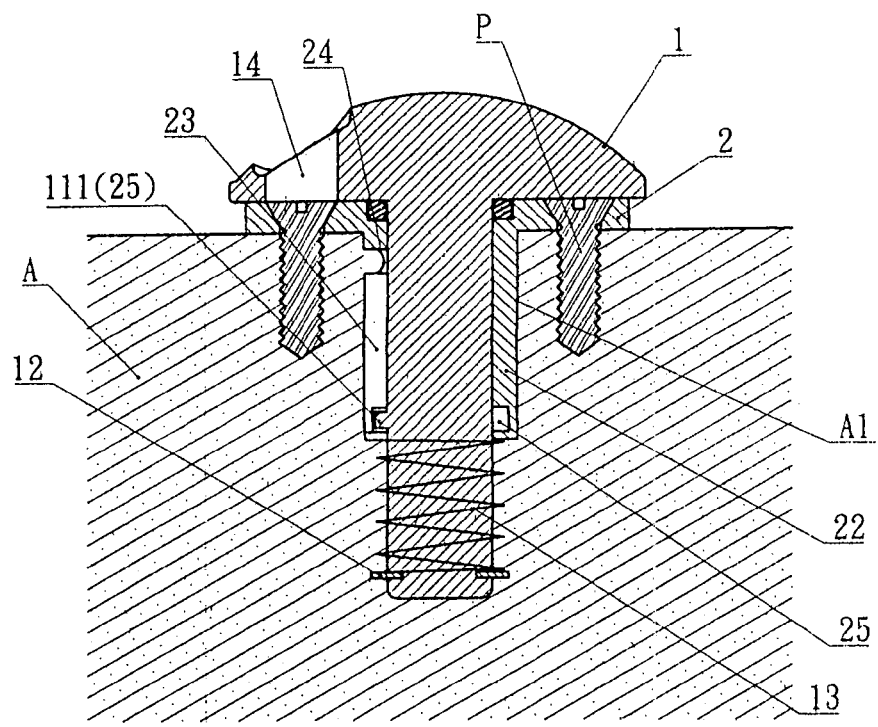
FIG. 4-A

CABLE RETAINER USED IN BOAT

FIELD OF THE INVENTION

The present invention relates to retainers, and particularly to a cable retainer used in a boat, wherein when the cable is released, the user does not need hold the retainer by one hand and pull the cable by another hand.

BACKGROUND OF THE INVENTION

Referring to FIG. 1, a prior art cable retainer used in a boat is illustrated. The prior art has a retaining seat 1 on a boat body A and a retaining block 2 assembled to the retaining seat 1. A lower center of the retaining seat 1 protrudes with an inserting rod 11 which can be inserted into the positioning hole A1 of the boat body A. A lower section of the inserting rod 11 has stoppers 12 for resisting against a lower end of the spring 13 enclosing the inserting rod 11. A top disk 10 of the retaining seat 1 has a penetrating hole 14 at a position coupling to a locking hole of the retaining block 2 for receiving an embedding stud P. The retaining block 2 receives the inserting rod 11 of the retaining seat 1. When the inserting rod 11 is received in the retaining block 2, the spring 13 encloses the lower end of the retaining seat 1. The lower end of the spring 13 resists against an upper side of the stopper 12 of the retaining seat 1. A top disk of the retaining block 2 resists on the top disk of the retaining seat 1. A top of the retaining block 2 has a plurality of tapered locking holes. Thereby, the penetrating hole 14 can be aligned to one of the locking holes so as to screw with the embedding stud P. Thus, the retaining seat 1 and retaining block 2 are fixed to a boat body A. The retaining seat 1 can be screw upwards so that a space is formed between the top disk of the retaining seat 1 and the top disk of the retaining block. The space serves to wind cables. Since in this prior art, the space can not be fixed, in winding or releasing the cable, the user must hold the cable retainer by one hand and release the cable by another hand. Thereby, the operation is tedious and inconvenient.

SUMMARY OF THE INVENTION

Accordingly, the primary object of the present invention is to provide a cable retainer comprising a retaining block and a retaining seat. The retaining block comprises a first top disk; and an annular sleeve extending from the first top disk. The annular sleeve of the retaining block enclosing the inserting rod has a long guide slot. An uppermost of the guide slot is extended with engaging slots from two sides of the guide slot and a lowermost end of an inner surface of the annular sleeve has an annular limiting trench. The retaining seat further comprises a second top disk and an inserting rod extending from the top disk. A lower end of the inserting rod has a stopper for resisting the first top disk of the retaining block to the second top disk of the retaining seat. The retaining block and the retaining seat is fixed to the boat body by using a stud. A small block extends from the retaining seat at a position corresponding to the annular limiting trench of the retaining block. The small block can move along the annular limiting trench of the retaining block. Then the small block is coupled to the guide groove, the retaining seat can move along the uppermost of the guide groove to be buckled in the engaging groove.

The various objects and advantages of the present invention will be more readily understood from the following detailed description when read in conjunction with the appended drawing.

BRIEF DESCRIPTION OF THE DRAWINGS

FIG. 2A is a cross sectional view of the retaining block of the present invention.
FIG. 4 is a plane view showing the operation of the present invention.
FIG. 4A is a plane cross sectional view of the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
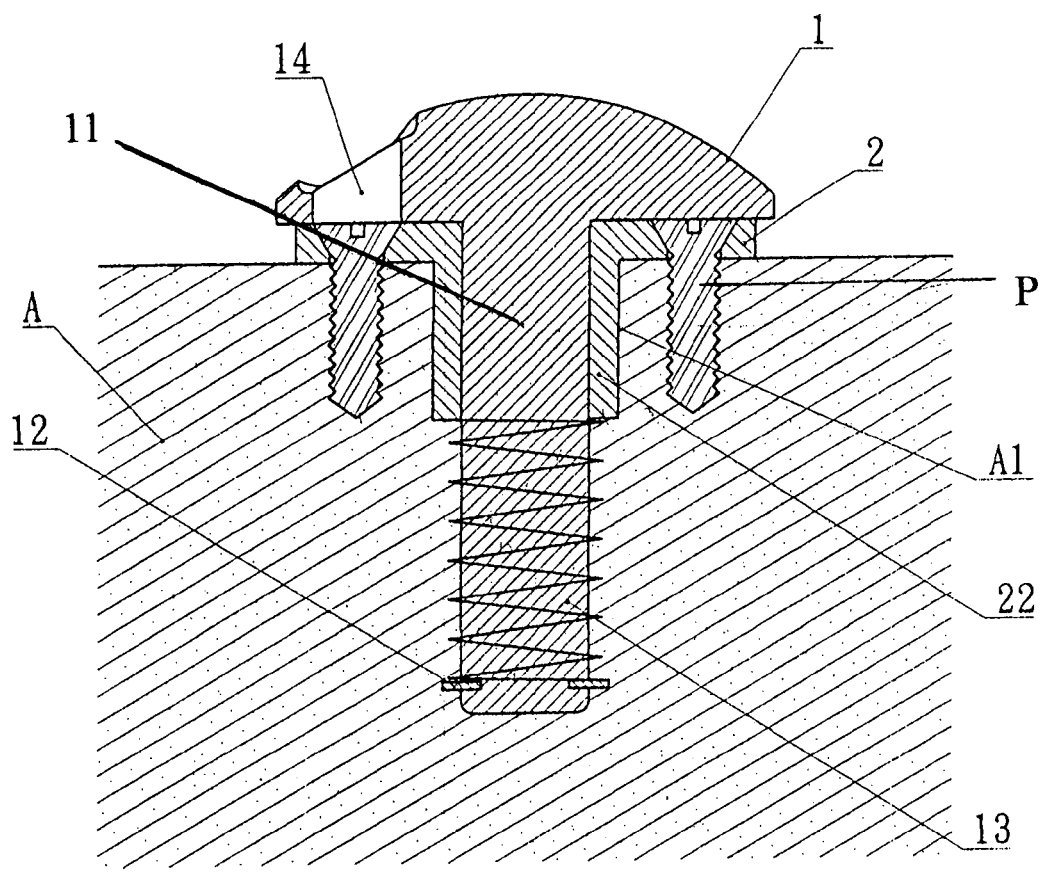
FIG. 1 is a plane cross sectional view of the prior art.
Figure 2:
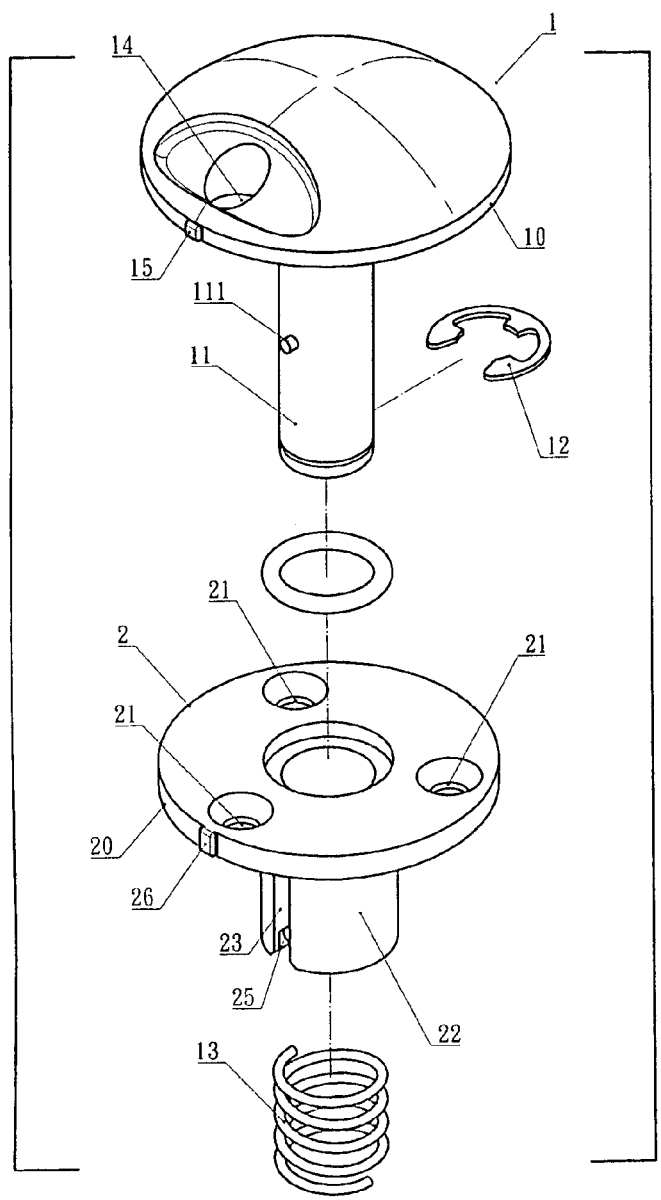
FIG. 2 is an exploded perspective view of the present invention.
Figure 2:
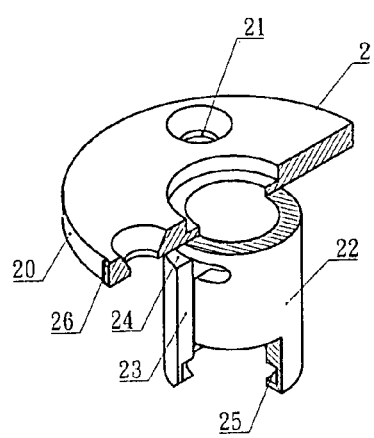
Figure 3:
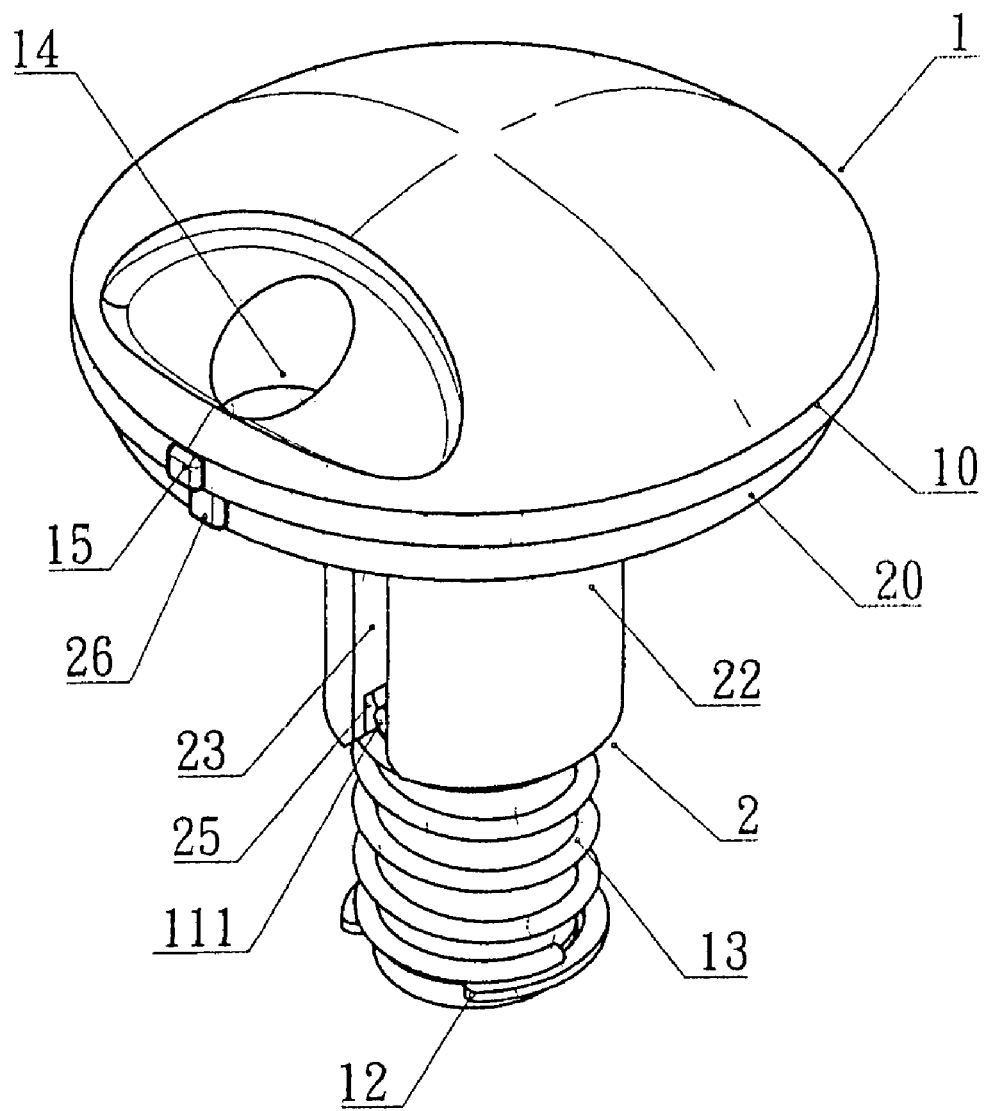
FIG. 3 shows an assembled perspective view of the present invention.

Referring to FIGS. 2 and 3, the structure of the present invention is illustrated. The present invention is formed by a retaining seat 1 on a boat body A and a retaining block 2 assembled to the retaining seat 1.

A predetermined position of the boat body A is formed with a positioning hole A1 for fixing the cable retainer of the present invention.

A lower center of the retaining seat 1 protrudes with an inserting rod 11 which can be inserted into the positioning hole A1 of the boat body A. A lower section of the inserting rod 11 has a stopper 12 for resisting against a lower end of the spring 13. A top disk 10 of the retaining seat 1 has a penetrating hole 14 at a position coupling to a locking hole 21 of the retaining block 2 for receiving the embedding stud P.

The retaining block 2 receives the inserting rod 11 of the retaining seat 1. The retaining block 2 is able to rotate around the retaining seat 1. When the inserting rod 11 is embedded into the retaining block 2, the spring 13 encloses the lower end of the retaining seat 1. The lower end of the spring 13 resists against an upper side of the stopper 12 of the retaining seat 1. A top disk 20 of the retaining block 2 resists on the top disk 10 of the retaining seat 1. A top of the retaining block 2 has a plurality of tapered locking holes 21. Thereby, the penetrating hole 14 can be aligned to one of the locking holes 21 so as to screw with the embedding stud P. Thus, the retaining seat 1 and retaining block 2 are fixed to a boat body A.

In the present invention, an annular sleeve 22 of the retaining block 2 enclosing the inserting rod 11 has a long guide slot 23. The uppermost of the guide slot 23 is extended with engaging slots 24 from the two sides of the guide slot 23. A lowermost end of an inner surface of the annular sleeve 22 has an annular limiting trench 25 at a position corresponding to a small block 111 of the retaining seat 1 so that the inserting rod 11 of the retaining seat 1 can rotate in the retaining block 2.

The retaining seat 1 has a small block 111 at a position corresponding to the annular limiting trench 25 of the retaining block 2. The small block 111 can move along the annular limiting trench 25 of the retaining block 2. When the small block 111 is coupled to the guide groove 23, the retaining seat 1 moves along the uppermost of the guide groove 23 to be buckled in the engaging groove 24.

After the small block 111 of the retaining seat 1 is coupled to the guide groove 23 of the retaining block 2, the top disk 20 of the retaining block 2 can be formed with an identification point 26, and the top disk 10 of the retaining seat 1 can be formed with an identification point 15.

Operation of the present invention will be described here, with reference to FIG. 4. At first, the retaining seat 1 and the retaining block 2 are instead into the positioning hole A1 of the boat body A and the retaining seat 1 is rotatable inside the retaining block 2. The penetrating hole 14 of the retaining seat 1 is aligned to one of the locking holes 21 of the retaining block 2. The embedding stud P passes through the penetrating hole 14 of the retaining seat 1 and the locking hole 21 of the retaining block 2 so that the retaining seat 1 and the retaining block 2 are fixed to the boat body A. By the identification points 26, 15 of the retaining block 2 and the retaining seat 1, respectively, when the two identification points 26, 15 are aligned, the small block 111 of the retaining seat 1 is aligned to the guide groove 23 of the retaining block 2. Thereby, the stopper 12 at the lower end of the retaining seat 1 will press the spring 13 to move upwards so that a space S is formed between a top of the retaining seat 1 and the retaining block 2. Then, rotating the retaining seat 1, the small block 111 is driven to move leftward or rightward to be buckled to the engaging groove 24 of the retaining block 2. Thereby, the space S between the retaining seat 1 and the retaining block 2 is fixed for winding cable.

By temporarily fixing the space S between the retaining seat 1 and the retaining block 2, when the cable is released, the user does not need hold the retainer by one hand and pull the cable by another hand.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cable retainer used in a boat comprising
   a retaining block further comprising:
   a first top disk; and
   an annular sleeve extending from the first top disk; the annular sleeve having a guiding slot; an uppermost of the guide slot being extended with engaging slots from two sides of the guide slot; a lowermost end of an inner surface of the annular sleeve having an annular limiting trench which is communicated with the guiding slot; and
   a retaining seat further comprising:
   a second top disk and
   an inserting rod extending from the top disk; and inserting into the annular sleeve of the retaining block; a lower end of the inserting rod having a stopper for resisting the first top disk of the retaining block against the second top disk of the retaining seat; the retaining block and the retaining seat being fixed to the boat body by using a stud;
   a small block extended from the retaining seat at a position corresponding to the annular limiting trench of the retaining block;
   wherein the small block can move along the annular limiting trench of the retaining block; when the small block is coupled to the guide groove, the retaining seat can move along the uppermost of the guide groove to be buckled in the engaging groove.

2. The cable retainer used in a boat as claimed in claim 1, wherein the first and second top disks are formed with identification points; the identification point of the first top disk is at a position corresponding to the identification point of the second top disk.

* * * * *